United States Patent [19]

Labree

[11] Patent Number: 5,497,214
[45] Date of Patent: Mar. 5, 1996

[54] CAMERA MOUNT

[76] Inventor: Michael A. Labree, 13 Beard Rd., Hillsboro, N.H. 03244

[21] Appl. No.: 273,488

[22] Filed: Jul. 11, 1994

[51] Int. Cl.$^6$ .................................................. G03B 29/00
[52] U.S. Cl. ...................... 354/81; 354/293; 248/187.1
[58] Field of Search ............................... 354/81, 82, 293; 352/243; 224/185; 248/230

[56] References Cited

U.S. PATENT DOCUMENTS

| | | | |
|---|---|---|---|
| 4,208,028 | 6/1980 | Brown et al. | 224/185 |
| 4,640,481 | 2/1987 | Kohno | 354/293 X |
| 4,964,603 | 10/1990 | Yair | 248/230 |
| 5,275,364 | 1/1994 | Burger et al. | 354/293 X |

*Primary Examiner*—Howard B. Blankenship

[57] ABSTRACT

A camera mount wherein a support boss is arranged for selective engagement of an available support post, and the support boss includes an articulated linkage arm system, including first and second levers secured to the support boss, with the second lever secured to a first rotative member, and the first rotative member is secured to a second rotative member that in turn is secured to a third rotative member spaced from the second rotative member, and the third rotative member has extending therefrom a support plate for supporting a camera thereon.

6 Claims, 4 Drawing Sheets

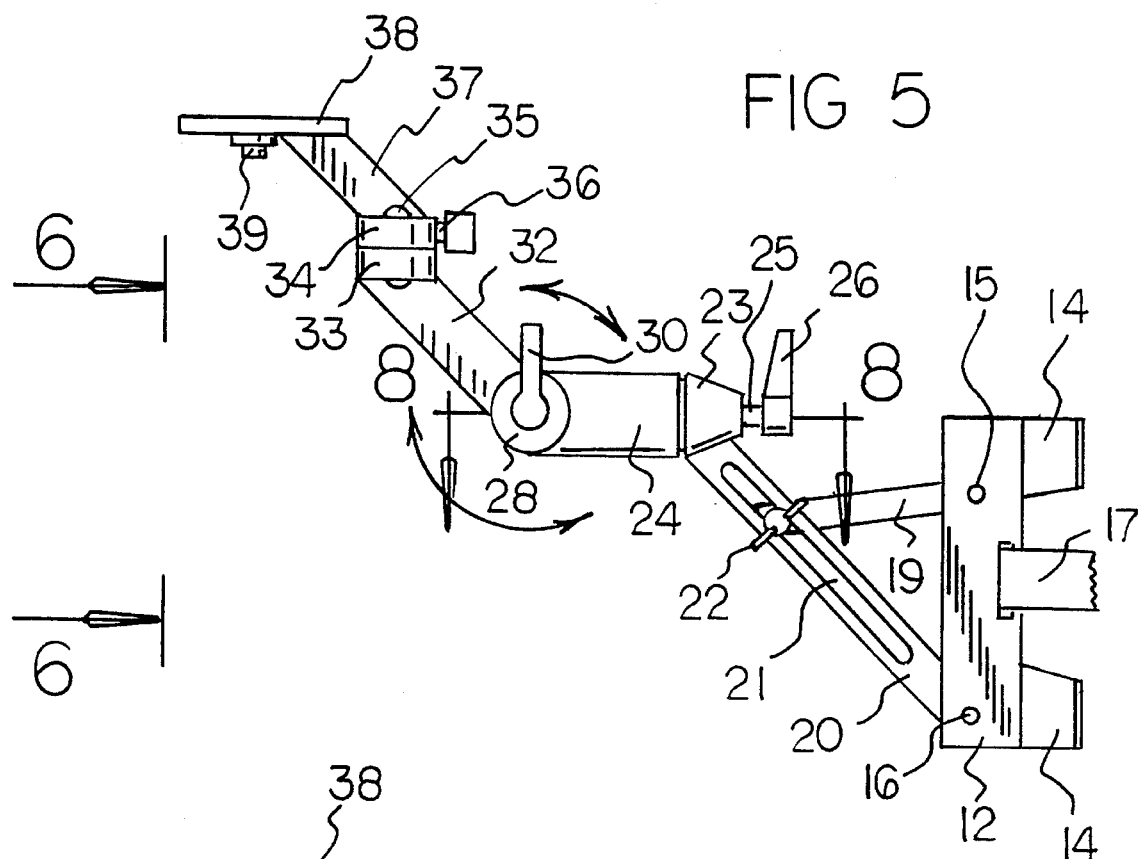
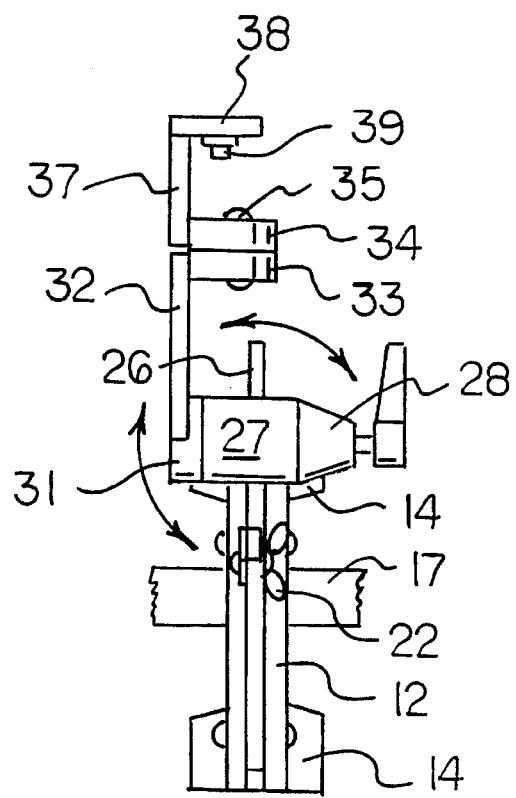

CAMERA MOUNT

TECHNICAL FIELD

The field of invention relates to camera mount structure, and more particularly pertains to a new and improved camera mount wherein the same is arranged for selective securement relative to an available support post, tree, and the like.

BACKGROUND OF THE INVENTION

Camera mounts of various types have been utilized throughout the prior art such as indicated in U.S. Pat. No. 4,640,481, wherein a camera holder is arranged for securement to a manual grip permitting various angulations of the camera.

U.S. Pat. No. 4,964,603, provides a mount structure for securement to a bicycle.

Various mounting devices utilized throughout the prior art employing strap-like structure are indicated in U.S. Pat. Nos. 5,117,779 and 5,098,051.

SUMMARY OF THE INVENTION

The present invention relates to camera mount structure wherein the same employs a strap mechanism to secure a support boss to an associated post member and wherein plural angulated head structures are arranged to provide for pivoting and articulation of an associated camera secured to the organization relative to the support boss.

Objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 5 is an orthographic side view of the invention.

FIG. 6 is an orthographic view, taken along the lines 6—6 of FIG. 5 in the direction indicated by the arrows.

DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
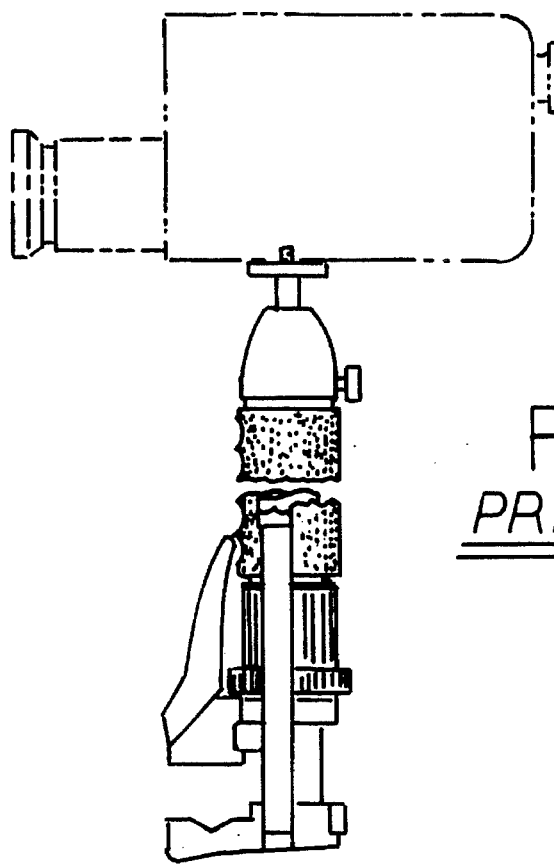
FIG. 1 is an orthographic view of a prior art camera mount, as indicated in U.S. Pat. No. 4,640,481.
Figure 2:
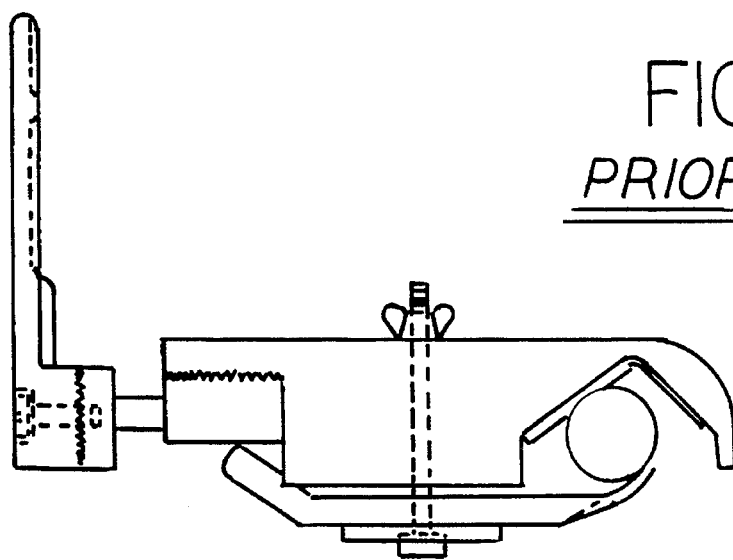
FIG. 2 is an orthographic view, as indicated in U.S. Pat. No. 4,964,603, for securing an article to a bicycle.
Figure 3:
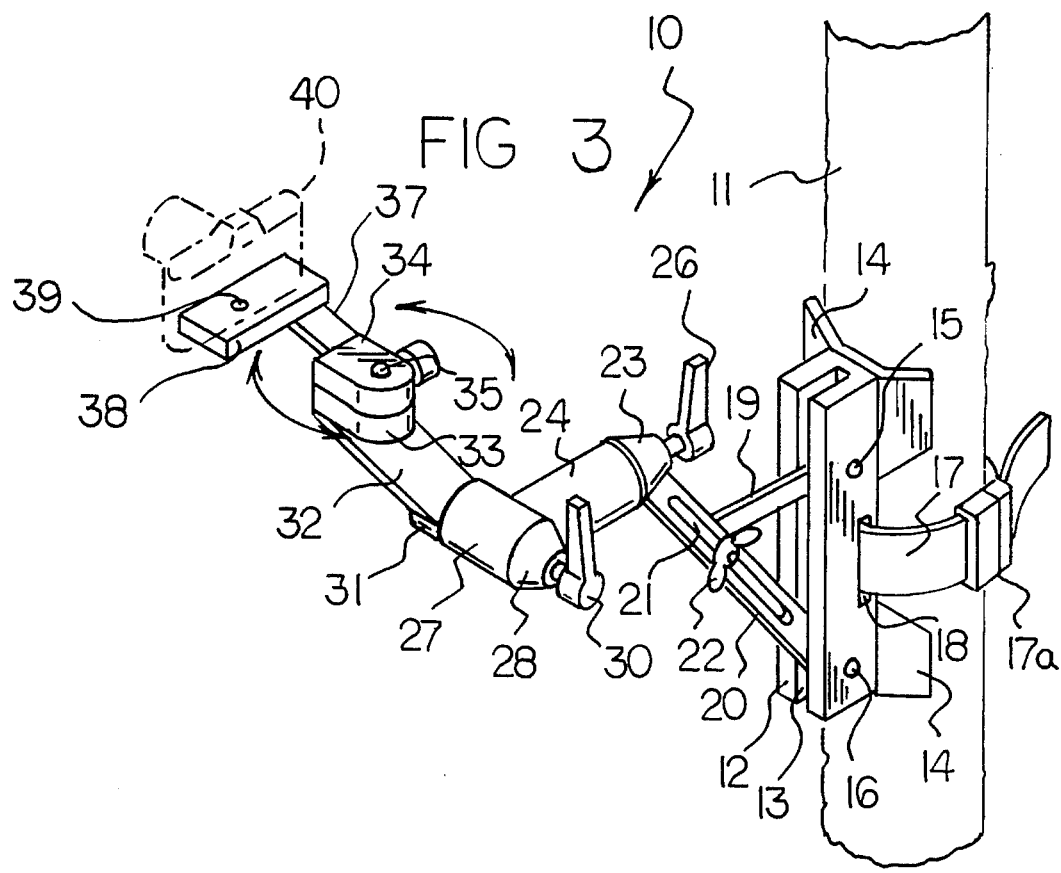
FIG. 3 is an isometric illustration of the invention.
Figure 4:
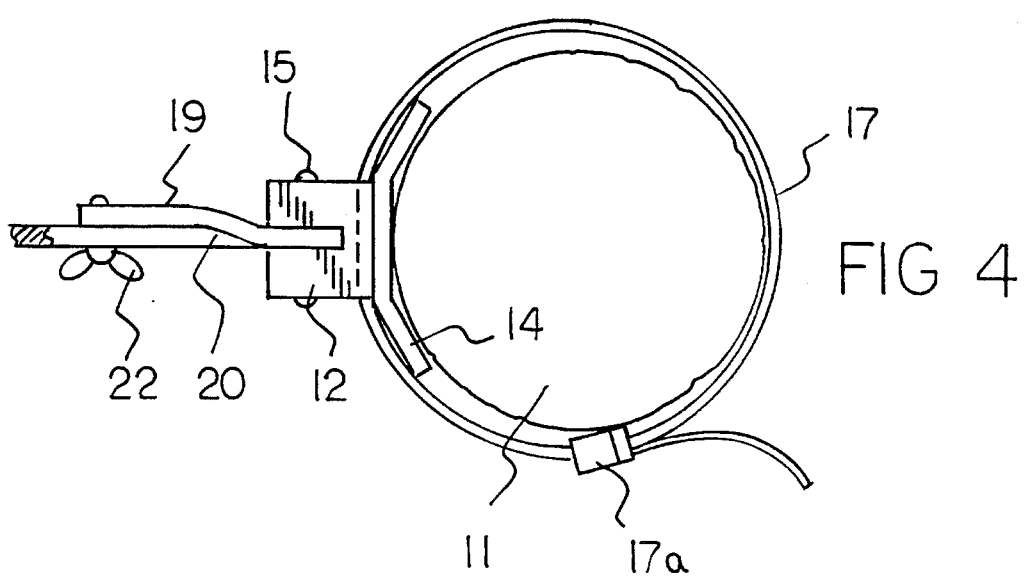
FIG. 4 is an orthographic partial view of the support boss structure and its securement to an associated post member.
Figure 7:
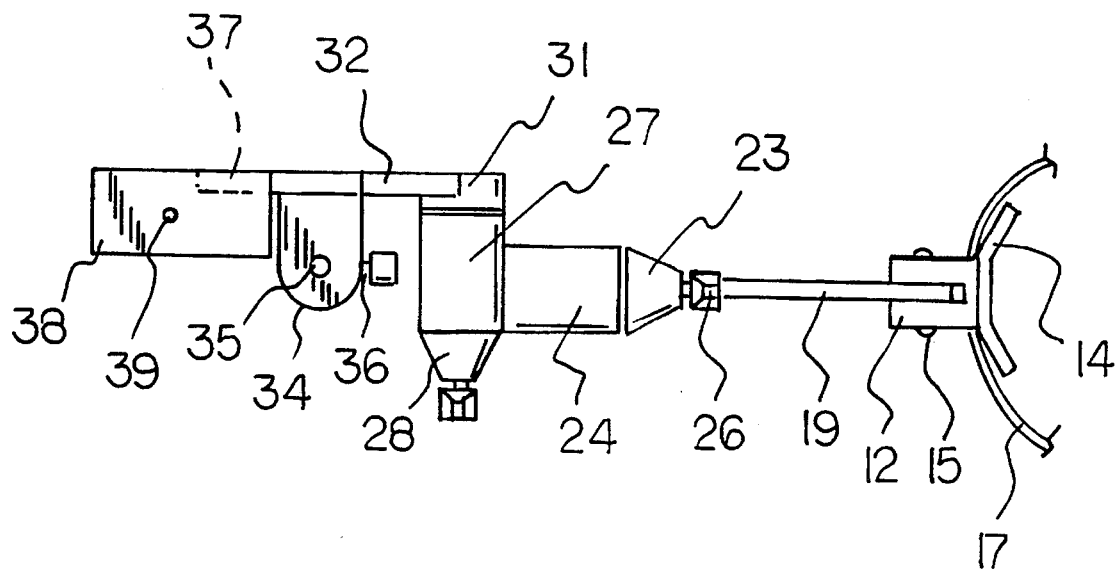
FIG. 7 is an orthographic top view of the invention.
Figure 8:
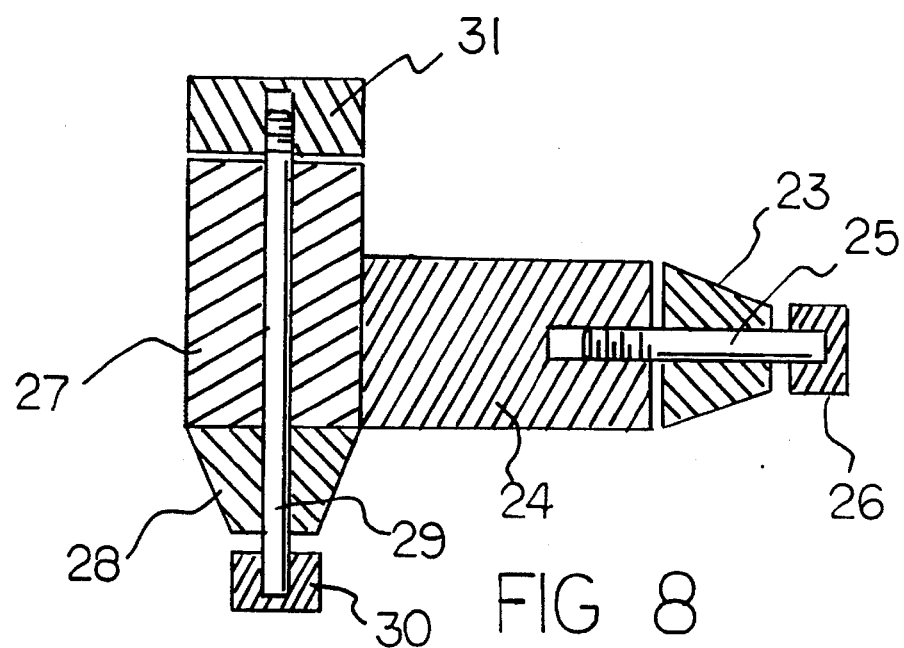
FIG. 8 is an orthographic cross-sectional illustration of the first and second body members arranged in an orthogonal fixed association relative to one another.

The camera mount structure 10 of the invention is arranged for supporting to an available support post 11 not specifically forming a part of the invention but available for having the invention secured thereto such as an available tree, telephone pole, etc. A bifurcated support boss 12 is provided in the invention having an aligned elongate slot 13, with the support boss 12 including at least one concave base plate 14, wherein a plurality of such base plates 14 are provided for receiving the support post 11. A flexible strap 17 is provided received through a receiving slot 18 within the support boss, that in turn is orthogonally oriented relative to the elongate slot 13, or at least obliquely oriented thereto, such that the flexible strap 17 having a strap coupling 17a is arranged for securement about the support post 11. First and second support rods 15 and 16 directed through the elongate slot 13 in an orthogonal relationship pivotally mount respective first and second levers 19 and 20. The second lever 20 is provided with a second lever slot 21, such that a first clamp 22 is slidable throughout the second lever slot 21 for selectively securing the outermost distal end of the first lever 19 to the second lever 20 along the second lever slot 21. To this end, a rod fixedly secured to the second lever outer distal end 19 is provided, with a wing-nut type member as exemplified in FIG. 3 clamping the second lever 20 between the first lever 19 and the noted wing-nut forming a part of the first clamp 22. The second lever 20 fixedly is secured to a first head 23 at an outermost distal end of the second lever 20, with the first head 23 rotatably mounting a first body 24 thereto about a first axle 25 directed through the first head 23 and rotative by manipulation of a first axle lever 26. The first body 24 orthogonally and fixedly is secured to a second body 27 that has at a first end of the second body 27 a second head 28 mounting a second axle 29 through the second head 28, the second body 27, and directed into a first pivot block 31 about the second axle 29 that is rotatable by the use of a second axle lever 30. The first pivot block is accordingly clampable against the second body 27 upon rotatably securing and drawing the second head 28 and the first pivot block 31 against the second body 27 by rotation of the second axle 29 by the second axle lever 30. A first flange 32 is fixedly secured to the first pivot block 31 and is orthogonally oriented relative to the second axle 29, that in turn is orthogonally oriented relative to the first axle 25. The first flange 32 extends to a second pivot block 33 that is rotatably mounted relative to a third pivot block 34 about a third axle 35, that in turn is orthogonally oriented to and spaced from the second axle 29. A lock rod 36 is rotatably directed through the third pivot block 34 to engage the third axle 35 to effect its arresting and thereafter prevent rotation of the second pivot block 33 relative to the third pivot block 34. A second flange 37 is fixedly mounted to and extends from the third pivot block 34 and is arranged generally parallel to the third axle 35, The second flange 37 extends to a support plate 38 that has a fastener 39 directed therethrough for securement to a camera 40 positioned upon the support plate 38.

In this manner, it is understood that the camera 40 may be rotated and articulated into a myriad of infinite combinations relative to the support post 11 for proper positioning of the camera 40 for use.

It is to be understood that while certain forms of the present invention have been illustrated and described herein, it is not to be limited to the specific forms or arrangement of parts described and shown.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed and desired to be protected by LETTERS PATENT of the United States is as follows:

1. A camera mount, comprising, a support plate arranged for receiving a camera thereon, with a linkage means extending from the support plate for permitting articulation of the support plate, with the linkage means extending to a support boss, the support boss having at least one concave base plate for securement about a support post, and the support boss arranged for receiving the linkage means, with the linkage means including a first lever pivotally secured to the support boss, and a second lever spaced from a first lever, with the second lever pivotally mounted to the support boss, and a first clamp arranged for permitting sliding adjustment of the first lever relative to the second lever.

2. A camera mount as set forth in claim 1 wherein the second lever has a spaced distal end spaced from the support boss, and the spaced distal end fixedly secured to a first head of the linkage means, and a first axle extending through the first head, the first axle having a first axle lever fixedly secured to the first axle, and a first body positioned coaxially of the first head receiving the first axle, whereupon rotation of the first axle permits selective securement and release of the first head relative to the first body permitting selective rotation of the first body relative to the first head.

3. A camera mount as set forth in claim 2 wherein the linkage means further includes a second body fixedly and orthogonally secured to the first body, the second body having a second head at a second body first end, and a first pivot block coaxially aligned relative to the second body and a second body second end, with a second axle extending through the second head and into the first pivot block, with a second axle lever permitting selective rotation of the second axle permitting selective securement and clamping of the second head and the first pivot block to the second body.

4. A camera mount as set forth in claim 3 wherein the linkage means further includes a first flange fixedly secured to the first pivot block, the first flange is orthogonally oriented relative to the second axle, with the second axle orthogonally oriented relative to the first axle.

5. A camera mount as set forth in claim 4 wherein the linkage means further includes a second pivot block secured to the first flange, with the second pivot block spaced from the first pivot block, and a third pivot block rotatably mounted to the second pivot block, with a third axle directed through the second pivot block and the third pivot block, with a lock rod directed through the third pivot block for selective engagement of the third axle to arrest relative rotation of the second pivot block relative to the third pivot block.

6. A camera mount as set forth in claim 5 wherein the second flange is fixedly secured to the third pivot block, and the second flange extends from the third pivot block and is secured to the support plate.

* * * * *